(12) United States Patent
Eicher et al.

(10) Patent No.: US 10,415,709 B2
(45) Date of Patent: Sep. 17, 2019

(54) REFRIGERATION APPLIANCE WITH BEVERAGE DISPENSER AND VALVE ASSEMBLY FOR A CONTAINER OF THE DISPENSER

(71) Applicant: BSH HAUSGERAETE GMBH, Munich (DE)

(72) Inventors: Max Eicher, Munich (DE); Christoph Becke, Grosskarolinenfeld (DE); Christine Hartwein, Nandlstadt (DE); Boris Angele, Diessen (DE)

(73) Assignee: BSH Hausgeraete GmbH, Munich (DE)

( * ) Notice: Subject to any disclaimer, the term of this patent is extended or adjusted under 35 U.S.C. 154(b) by 0 days.

(21) Appl. No.: 15/794,038

(22) Filed: Oct. 26, 2017

(65) Prior Publication Data

US 2018/0119821 A1    May 3, 2018

(30) Foreign Application Priority Data

Oct. 27, 2016    (DE) .......................... 10 2016 221 211

(51) Int. Cl.
*F16K 1/20* (2006.01)
*F16K 43/00* (2006.01)
(Continued)

(52) U.S. Cl.
CPC .......... *F16K 1/2071* (2013.01); *B67D 1/0081* (2013.01); *B67D 3/044* (2013.01);
(Continued)

(58) Field of Classification Search
CPC ...... B67D 1/0004; B67D 1/0081–0082; B67D 1/0094; B67D 3/0051; B67D 3/0025;
(Continued)

(56) References Cited

U.S. PATENT DOCUMENTS 3,208,641 A * 9/1965 Brugioni ............... F25D 23/126
222/108
3,476,295 A * 11/1969 Telfer ...................... F25D 23/04
222/183

(Continued)

FOREIGN PATENT DOCUMENTS

CN    103148655 A1 * 6/2013 ............... B67D 3/00
DE    8901630 U1    4/1989
JP    H10132456 A    5/1998

OTHER PUBLICATIONS

English Translation of the Description of CN103148655, Shizhong, Jun. 12, 2013, all pages.*

*Primary Examiner* — Paul R Durand
*Assistant Examiner* — Andrew P Bainbridge
(74) *Attorney, Agent, or Firm* — Laurence A. Greenberg; Werner H. Stemer; Ralph E. Locher (57) ABSTRACT

A refrigeration appliance, in particular domestic refrigeration appliance, has a heat-insulating housing, which surrounds a storage compartment for refrigerated goods and has at least one passage between the storage compartment and a dispenser recess disposed outside of the heat-insulating housing. A container-valve assembly is detachably installed in the storage compartment and projects through the passage. A cover for closing the dispenser recess is articulated at the housing.

15 Claims, 6 Drawing Sheets

(51) Int. Cl.
  *B67D 3/04* (2006.01)
  *B67D 1/00* (2006.01)
  *F25D 23/12* (2006.01)
(52) U.S. Cl.
  CPC ............ *F16K 43/00* (2013.01); *F25D 23/126* (2013.01); *B67D 2210/00041* (2013.01); *F25D 2323/023* (2013.01); *F25D 2400/36* (2013.01)
(58) Field of Classification Search
  CPC ............ B67D 3/044–045; B67D 3/047; B67D 3/0038; B67D 2001/0089; B67D 2210/00041; F16K 43/00; F16K 1/16; F16K 1/18; F16K 1/20; F16K 1/2028; F16K 1/2035; F16K 1/2071; F25D 23/04; F25D 23/126; F25D 23/12; F25D 23/123; F25D 23/025; F25D 23/028; F25D 2323/023; F25D 2400/14; F25D 2400/36
  USPC ...... 222/129, 185.1, 505, 517–518, 533–537
  See application file for complete search history.

(56) References Cited

U.S. PATENT DOCUMENTS

| | | | | |
|---|---|---|---|---|
| 3,914,957 | A * | 10/1975 | Jacobs | F25B 25/005 165/104.21 |
| 5,597,093 | A * | 1/1997 | Lee | B67D 1/0001 222/113 |
| 5,791,517 | A * | 8/1998 | Avital | B67D 3/00 222/1 |
| 5,794,517 | A * | 8/1998 | Emig | F16J 1/006 29/888.047 |
| 5,857,596 | A * | 1/1999 | Lee | B67D 3/0025 222/146.6 |
| 7,337,924 | B2 * | 3/2008 | Crisp, III | B67D 1/0021 222/129.1 |
| 7,455,085 | B2 * | 11/2008 | Voglewede | F25D 23/126 141/18 |
| 8,201,491 | B2 * | 6/2012 | Garman | A47J 31/057 222/146.5 |
| 9,828,229 | B2 * | 11/2017 | Yang | B67D 3/0035 |
| 2009/0038330 | A1 * | 2/2009 | Lee | F25C 1/04 62/344 |
| 2011/0062844 | A1 * | 3/2011 | Higami | F25D 23/025 312/405 |
| 2015/0239725 | A1 * | 8/2015 | Watts | B67D 3/0025 222/1 |
| 2016/0061511 | A1 * | 3/2016 | Park | F25D 11/02 312/404 |
| 2016/0370104 | A1 * | 12/2016 | Yang | F25D 23/126 |
| 2017/0240412 | A1 * | 8/2017 | Gallagher | B67D 3/0035 |
| 2017/0276423 | A1 * | 9/2017 | Jung | F25D 23/04 |

* cited by examiner

REFRIGERATION APPLIANCE WITH BEVERAGE DISPENSER AND VALVE ASSEMBLY FOR A CONTAINER OF THE DISPENSER

CROSS-REFERENCE TO RELATED APPLICATION

This application claims the benefit, under 35 U.S.C. § 119, of German patent application DE 10 2016 221 211.7, filed Oct. 27, 2016; the prior application is herewith incorporated by reference in its entirety.

BACKGROUND OF THE INVENTION

Field of the Invention:

The present invention relates to a refrigeration appliance, in particular a domestic refrigeration appliance, with a dispenser that is suitable for dispensing various beverages. A refrigeration appliance of the generic type is known from German utility model DE 89 01 630 U1, for instance.

DE 89 01 630 U1 (cf. EP 0382915) describes a refrigerator door, in a lower region on the exterior of which a dispenser recess is cut out. A number of openings are formed in a ceiling of the dispenser recess, into which a bottle provided with a screwed-on valve can be introduced from a storage compartment so that an outlet of the valve projects into the dispenser recess and can be actuated there in order to open the valve and thus draw off cooled beverage from one of the bottles without the door having to be opened for this purpose.

The openings and the valve housing which engages therein represent a thermal bridge between the environment and the storage compartment, which significantly increases the energy required to cool the storage compartment. If this over-consumption causes the energy efficiency class of the appliance to be downgraded, considerable sales losses result.

SUMMARY OF THE INVENTION

It is accordingly an object of the invention to provide a refrigeration appliance which overcomes the above-mentioned and other disadvantages of the heretofore-known devices and methods of this general type and which specifies a refrigeration appliance having a dispenser which is suitable for dispensing various beverages, with which the over-consumption of energy caused by the dispenser is minimized.

With the foregoing and other objects in view there is provided, in accordance with the invention, a refrigeration appliance, in particular a domestic refrigeration appliance, comprising:

a heat-insulating housing enclosing a storage compartment for refrigerated goods;

a dispenser recess disposed outside the heat-insulating housing and at least one opening between the storage compartment and the dispenser recess;

a container-valve assembly detachably installed in the storage compartment and projecting through the opening; and a cover hinged to the housing and configured to selectively close the dispenser recess.

In other words, the objects of the invention are achieved by a cover, by means of which the dispenser recess can be closed, being hinged to the housing in the case of a refrigeration appliance, in a particular domestic appliance, with a heat-insulating housing which surrounds a storage compartment for refrigerated goods and has at least one opening between the storage compartment and a dispenser recess outside of the heat-insulating housing, and with a container-valve assembly which is detachably installed on the housing to ensure the opening. In fact the cover has no influence on the heat conductivity of the opening per se, however it prevents air cooled in the dispenser recess from freely distributing into the environment. Instead, the air in the dispenser recess gradually cools down by it outputting heat via the housing to the storage compartment so that the temperature gradient along the opening reduces and less heat therefore flows from the dispenser recess into the storage compartment.

The housing may have at least one clear-view window, through which a container, pertaining to the container-valve assembly, arranged in the storage compartment can be seen. Therefore a user can if applicable identify its contents without having to open the storage compartment with the aid of an inscription or another identifier on the container.

If the container is for its part translucent at least in one region which faces the clear-view window, a user can also identify the fill level of the container, without having to open the door of the refrigeration appliance or remove the cover.

In accordance with an added feature of the invention, the cover extends beyond the clear-view window.

In particular, in the latter case it is advantageous if the cover is at least partially transparent, so that the container is visible through the cover and the clear-view window.

In particular, the cover can cover the entire door. If the dispenser recess is accommodated in a manner known per se in a door of the refrigeration appliance for instance, the cover can cover the entire door.

An adapter section can be provided on the container-valve assembly. In particular, the adapter section can be adjusted to the shape of the opening. In particular, the adapter section can fill the cross-section of the opening. Therefore the penetration of warm ambient air from the dispenser recess to the container can be restricted and the energy consumption of the refrigeration appliance can be further reduced.

The container can be inserted into a recess on an inner surface of the housing. The container and the contents themselves can therefore contribute to thermally insulating the storage compartment.

The container should preferably fill the recess widthwise, across its width.

The container preferably has a lid in an upper region and the valve is detachably installed on an outlet in a lower region of the container. Since contrary to the valve the lid does not have to close hermetically, its dimensions can be large so that if the lid is removed, the container is both easy to clean and also easy to refill.

In the vertical the container can be received in the recess in a manner so as to retain play, in order to facilitate insertion of the adapter section into the opening.

The refrigeration appliance can have a number of assemblies comprising in each case a container and an outlet.

To enable a space-saving accommodation, the plurality of containers can have flat side walls which touch one another.

With the above and other objects in view there is also provided, in accordance with the invention, a valve, comprising:

a valve seat annularly extending about an opening;

a closing element disposed to be tiltable about a pivotal point between a closed position and an open position;

wherein the closing element rests on the valve seat around the opening in the closed position and the valve seat and the closing element touch one another in the open position.

The novel valve may be specifically configured for a container-valve assembly of a refrigeration appliance as summarized above.

That is, the subject matter of the invention is further a valve adjusted specifically for insertion into the afore-described container-valve assembly. This valve comprises a valve seat which extends in an annular manner about an opening and a closing element, which, in a closed position, rests on the valve seat all around the opening and can be tilted between the closed and an open position about a pivotal point at which the valve seat and closing element touch one another in the open position. On the one hand, this valve is easy and cost-effective to manufacture, on the other hand it can be actuated in the refrigeration appliance by a simple mechanism, such as is made apparent in detail from the description which follows.

An adapter section, in which the valve seat is formed, can have a screw thread, in order to simplify the attachment to an exchangeable container for a beverage to be drawn off.

The closing element can be forced into the closed position by a spring. For safety reasons the spring may be provided if the valve closes with the pressure of the contents of the container; however it also permits, as shown in the exemplary embodiment, an arrangement of valve seat and sealing element, in which the valve closes counter to the pressure of the contents of the container.

If a cap is provided at one end of the pin which faces away from the closing element, the spring can be compressed between the cap and a base plate, in which the opening of the valve is formed.

If this cap is detachably connected to the pin, in particular connected with screws, it is particularly easy to dismantle and clean the valve e.g. if a container is emptied and is to be replaced by a full one.

An actuation section which projects from the closing element in the direction of flow of the valve can be provided to open the valve. By the actuation section being deflected at right angles to the flow direction, the closing element is tilted and as a result the valve is opened.

In order to catch the beverage passing through the valve without loss and to direct the same into a collecting vessel held below the valve, a cup-shaped element is useful and is attached to the actuation section and has an outlet opening for the beverage in the base of the cup.

To ensure that beverage passing through the opening reaches the cup-shaped element in its entirety, provision can be made for a web which extends around the valve seat and which engages in the cup-shaped element.

In other words, one aspect relates to a valve, in particular for the container-valve assembly of a refrigeration appliance, as described herein, with a valve seat which extends in an annular manner about an opening and a closing element, which, in a closed position, rests on the valve seat all around the opening and can be tilted between the closed and an open position about a pivotal point, at which the valve seat and closing element touch one another in the open position.

The valve seat is preferably formed in an adapter section. The valve seat preferably has a screw thread for screwing on a container.

A pin which is fixedly connected to the closing element preferably extends through the opening. Alternatively or in addition, the closing element is forced into the closed position by a spring.

A cap is preferably provided at one end of the pin which faces away from the closing element and the spring is compressed between the cap and a base plate, in which the opening is formed.

The cap is preferably detachably connected to the pin, in particular connected with screws.

An actuation section preferably projects from the closing element in the flow direction of the valve.

A cup-shaped element which has a passage in the base of the cup is preferably attached to the actuation section. Furthermore, a web which extends about the valve seat preferably engages into the cup-shaped element.

Other features which are considered as characteristic for the invention are set forth in the appended claims.

Although the invention is illustrated and described herein as embodied in a refrigeration appliance with beverage dispenser, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
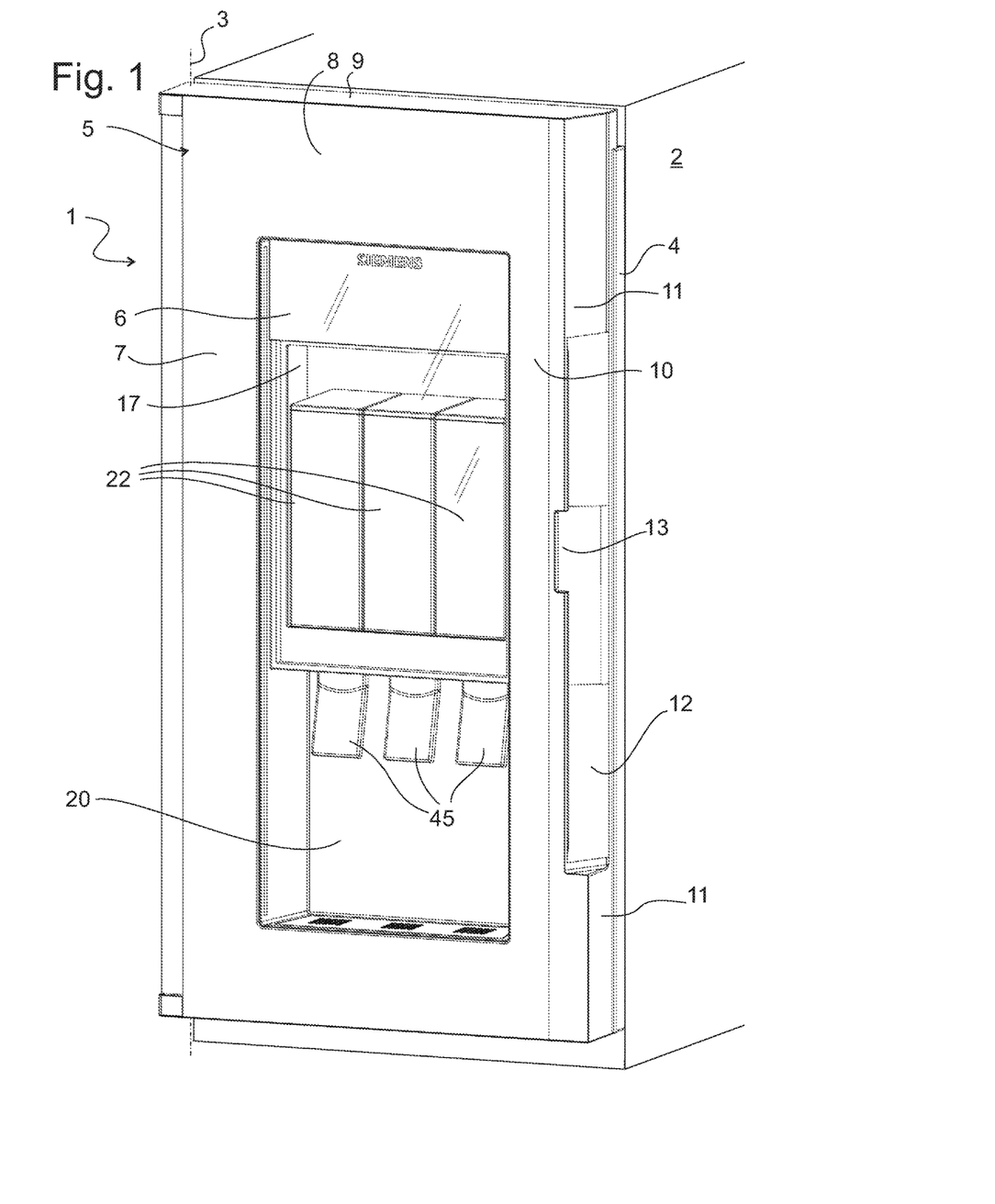
FIG. 1 shows a perspective external view of a door assembly of an inventive refrigeration appliance.

Referring now to the figures of the drawing in detail and first, particularly, to FIG. 1 thereof, there is shown a door assembly 1 and a housing shell 2, also referred to as a carcass 2, only shown partially, form a housing of a refrigeration appliance which surrounds a storage compartment for refrigerated goods. The door assembly 1 is pivotally hinged on the housing shell 2 about an axis 3.

In the narrower sense the door assembly 1 comprises a door 4 which closes the storage compartment and a cover 5 which can be pivoted relative to the door 4 about the same axis 3. In the view in FIG. 1, the door 4 is shown largely concealed by the cover 5 or covered at the front.

The cover 5 comprises a window glass 6 made of clear or tinted glass or plastic, here enclosed by a frame 7. The frame 7 may be non-transparent or in transparent or opaque. An upper strip of the frame 7 is L-shaped in the sectional view, with a limb 8 which extends vertically upwards from the window glass 6 and a limb 9 which is bent from an upper edge of the limb 8 toward the housing shell 2 and extends beyond an upper face of the door 4. Correspondingly a right strip of the frame comprises a limb 10 which extends from the right edge of the window glass 6 in the width direction of the door assembly 1 and a limb 11 bent toward the housing shell which is however divided into an upper and a lower half by a handle cutout 12. A center piece 13 of the handle cutout 12 extends from the edge into the limb 10.

Figure 2:
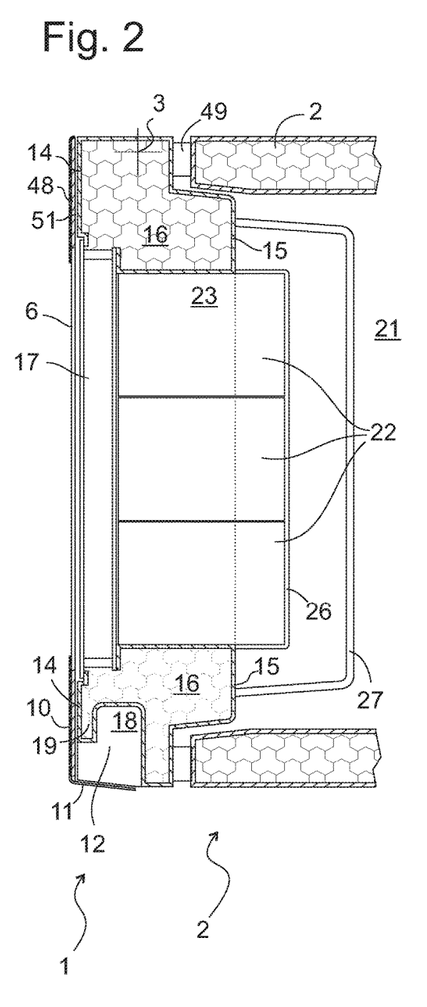
FIG. 2 shows a horizontal section through the door assembly at the level of the beverage containers installed therein.

FIG. 2 shows a horizontal section through the door assembly 1 along a plane, which runs at the level of the handle cutout 12 just above the center piece 13. As is customary, the door 4 comprises fixed external and internal walls 14, 15, which are connected along their edges in order to form a cavity filled with heat-insulating foam 16. An opening into which an insulating glass pane 17 is inserted and which is tightly connected to the walls 14, 15 is cut here into the external and internal wall 14, 15 in each case. In a lateral face of the door 4, a laterally open gripping groove 18 is cut out and/or a gripping groove 18 is provided. The gripping groove 18 is delimited by a web 19 on its side facing the cover 5. The limb 10 of the cover projects laterally beyond the web 19 so that a user who engages in the handle cutout 12 at the level of the sectional plane in FIG. 2 gets hold of the limb 10 of the cover 5, but not automatically the web 19 of the door 4 as well, so if the user pulls the limb 10 towards himself, he pivots the cover 5 about the axis 3 but not the door 4.

Figure 3:
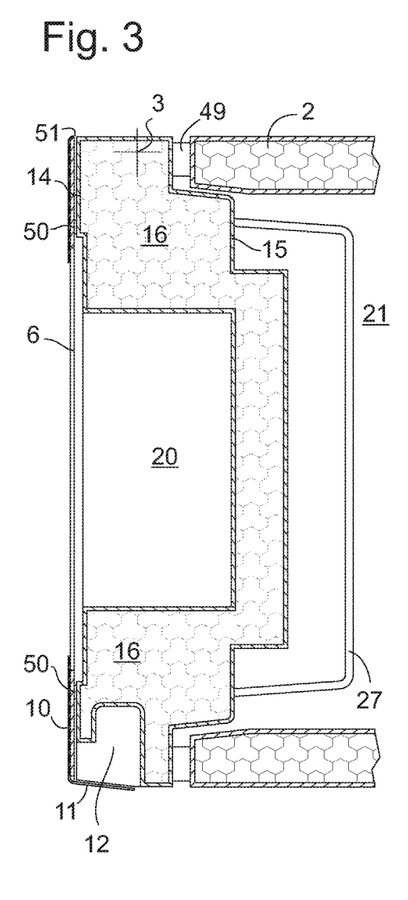
FIG. 3 shows a section through the door assembly at the level of a dispenser recess.

By pivoting (solely) the cover 5 about the axis 3, a dispenser recess 20, also referred to as a niche 20, which is cut out in a lower part of the door 4 and is shown in FIG. 3 in a horizontal section through the door assembly 1, becomes accessible.

Conversely the edge of the limb 10 is flush with the web 19 at the level of the center piece 13, so that a user, who engages at the level of the center piece, reaches into the gripping groove 18 and thus pivots the entire door assembly 1 about the axis 3, and a storage compartment 21 for refrigerated goods in the inside of the housing shell 2 becomes accessible.

FIG. 2 shows a sectional view of a number of beverage containers 22, which are accommodated in a recess 23 which is delimited by the insulating glass pane 17 and by faces of the internal wall 15 of the door 4 which are adjacent hereto and is open toward the storage compartment 21. The beverage containers 22 fill the recess 23 in the width direction in a substantially play-free manner. As apparent from FIG. 1, the beverage containers 22 are visible through the insulating glass pane 17 and the window glass 6. They can be provided with an inscription which identifies their contents and is visible through the glass panes 6, 17. The beverage containers 22 are preferably manufactured from a transparent plastic, so that the color and fill level of their contents are visible through the glass panes 6, 17.

An operating paddle 45 is installed in the dispenser recess 20 below each beverage container 22, and serves to open a valve and to fill a vessel with beverage from the container 22 disposed there below, said vessel being pressed against the operating paddle 45 in the dispenser recess 20.

Figure 4:
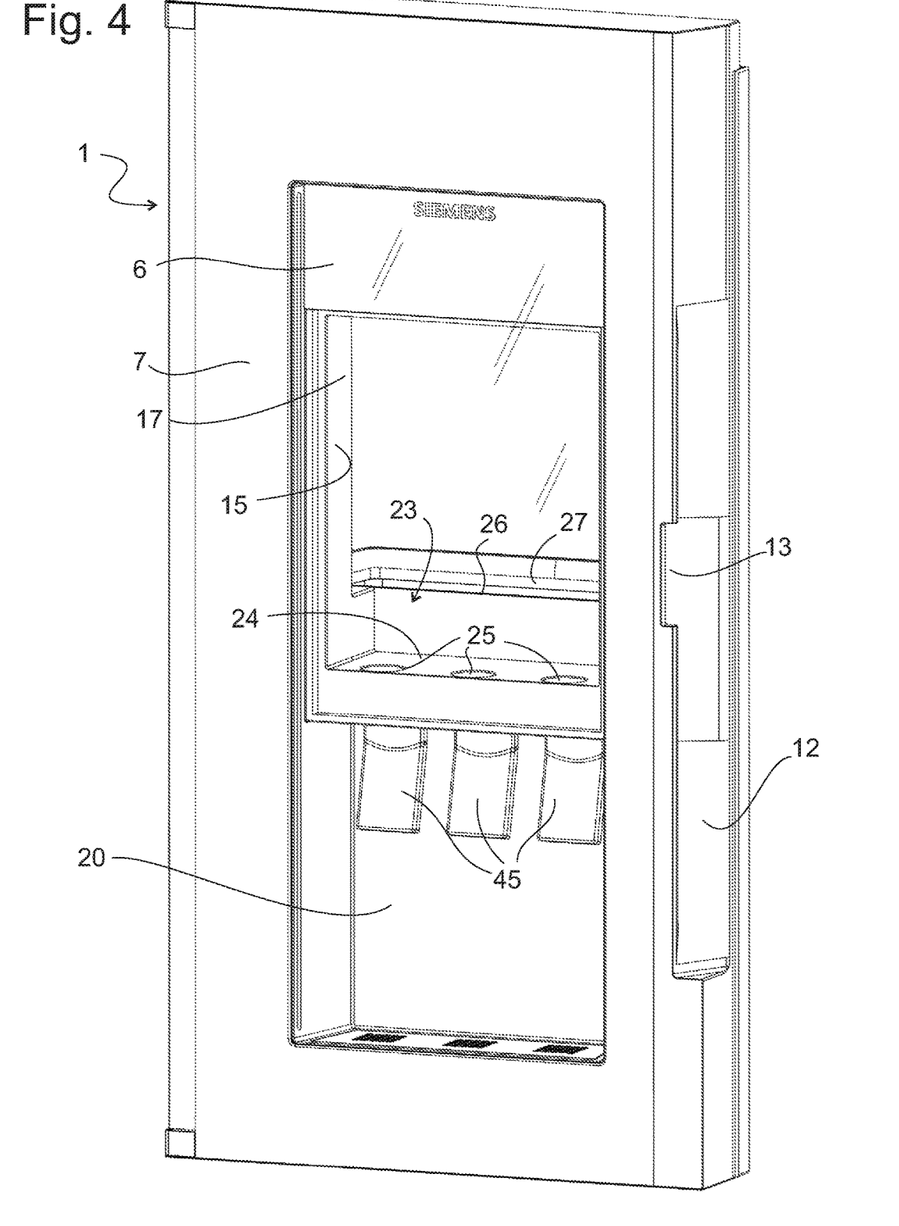
FIG. 4 shows a view of the door assembly without container which is analogous to FIG. 1.

FIG. 4 shows a view of the door assembly 1 from the same perspective as FIG. 1, however without the beverage containers 22, so that a base plate 24 of the recess 23, which would in any case be covered by the beverage containers 22, is visible through the insulating glass pane 17. The base plate 24 has an opening 25 to each beverage container 22, which connects the recess 23 with the dispenser recess 20 disposed there below.

An intermediate wall 26 which delimits the recess 23 from the storage compartment 21 projects on a rear edge of the base plate 24. A door tray 27 is suspended on the internal wall 15 on each side of the intermediate wall 26.

Figure 5:
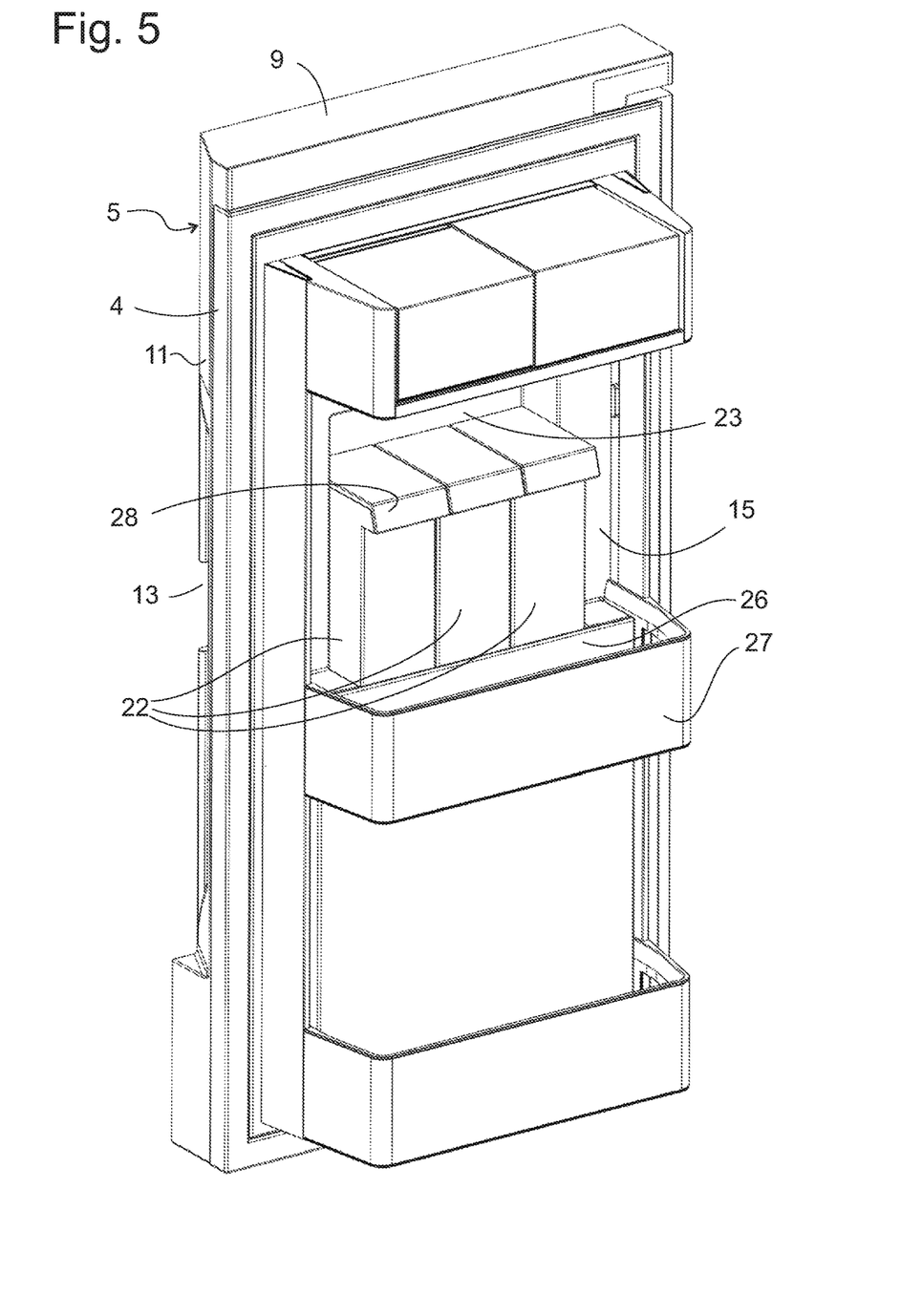
FIG. 5 shows a perspective view of the door from its inner surface.

FIG. 5 shows a view of the inner surface of the door assembly 1 which faces the storage compartment 21. The beverage containers 22 are received vertically in the recess 23 with sufficient play, so that they can be lifted, if applicable tilted, in the recess 23, and removed from the recess 23 across the intermediate wall 26.

To facilitate the insertion and removal of substantially square beverage containers 22 from the recess 23, each of these can be provided with a handle 28 on its rear facing the intermediate wall 26, such as shown in FIG. 5, in the form of a projection which extends across the entire width of the beverage container 22 and which is hollow on its underside in order to allow the user's fingers to engage therein.

Figure 6:
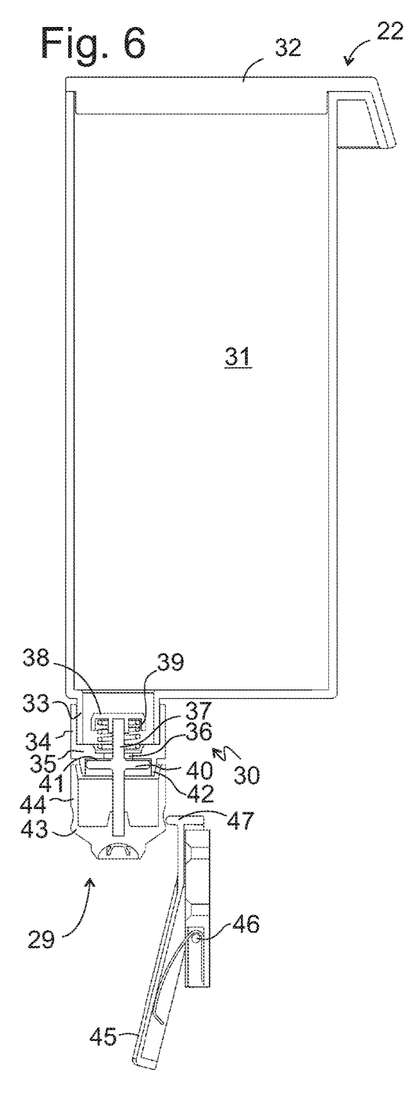
FIG. 6 shows a section through a container-valve assembly.

FIG. 6 shows a vertical section through one of the beverage containers 22 and a valve 29, which is connected to the beverage container 22 pertaining to the container-valve assembly 30. The beverage container 22 comprises a square container lower part 31 formed from preferably clear plastic, the open top side of which is closed by a lid 32. The lid 32 seals here by a projection of the lid 32 engaging in the container lower part 31 and resting in a frictionally engaged manner on the inner surfaces of its walls.

An outlet nozzle 33 is molded in one piece to the bottom of the container lower part 31, which, if the beverage container 22 is installed in the recess 23 and rests on the base plate 24, engages in the opening 25 thereof. The outlet nozzle 33 has an external thread, to which an adapter section 34 of the valve 29 is screwed. The diameter of the adapter section 34 is dimensioned such that it fills the entire cross-section of the opening 25 and thus keeps the relatively warm air in the dispenser recess 20 away from the bottom of the container lower part 31 and thus minimizes the transfer of heat from this air to the contents of the beverage container 22.

The adapter section 34 has a base plate 35, which covers the lower end of the outlet nozzle 33 and the contents of the beverage container 22 are present on its top side in the screwed-on state. A pin 37 extends through a central opening 36 in the base plate 35. A cap 38 is screwed onto the top end of the pin 37 and a helical spring 39 is elastically compressed between the cap 38 and the top side of the base plate 35. A circular disk-shaped closing element 40 is fastened to a middle section of the pin 37, said closing element being held in a tightly compressed manner against a valve seat 41 on the lower side of the bottom plate 35 by the voltage of the helical spring 39 all around the opening 36. The valve seat 41 is annularly surrounded by a web 42 which projects downward from the base plate 35.

The lower end of the pin 37 forms an actuation section 58, on the lower end of which a cup-shaped element 43 is fastened. In the installed state, the element 43 projects from above into the dispenser recess 20. A passage for drawn-off contents of the container 22 is formed on the bottom of the element 43. The passage, if applicable formed from a number of individual openings, lies outside of the sectional plane in FIG. 6 and is therefore not visible; a drip edge 59 which surrounds the passage can be seen however. A wall 44 of the element 43 which surrounds the bottom overlaps vertically with the web 42, but neither touches the web 42 nor the base plate 35, so that it does not prevent the closing element 40 from tilting into the open position. The diameter of the cup-shaped element 43 is not larger than that of the adapter section 34, so that if the container 22 is empty, the complete container-valve assembly 30 can be lifted until the element 43 is disposed in the recess 23 and can be removed herefrom in the direction of the storage compartment 21.

Figure 7:
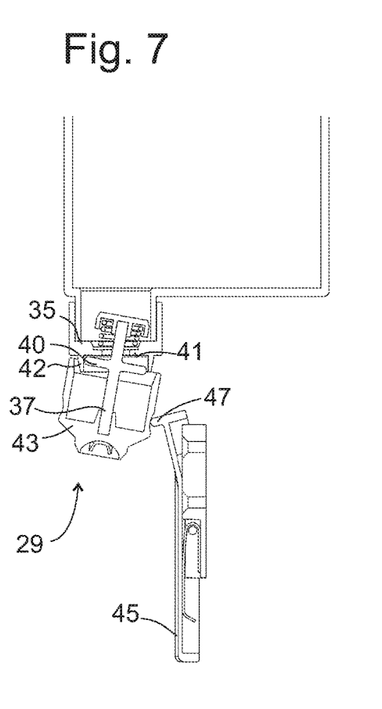
FIG. 7 shows the valve of the container-valve assembly in the open position.

The operating paddle 45 likewise shown sectionally in FIG. 6 forms an arm of a dual-armed lever which can be pivoted about an axis 46 perpendicular to the sectional plane counter to the force of a resetting spring. A second arm 47 of the lever is molded and dimensioned in order, if the operating paddle 45 is deflected by way of a counter-pressing vessel, to press laterally against the cup-shaped element 43. If in such cases the element 43 is deflected, the pin 37 tilts about a pivotal point 60 on the valve seat 41 and the closing element 40 detaches, as shown in FIG. 7, away from the pivotal point 60 of the valve seat 41. The valve 29 is now open. The web 42 ensures that liquid passing through cannot escape laterally out of the valve 29 between the base plate 35 and the top edge of the cup-shaped element 43, but instead collects in the cup-shaped element 43 and flows out into the vessel via this passage.

The position of the pivotal point 60 on the valve seat 41 is not defined by the design of the valve 29, but instead only by the direction in which the element 43 is pressed to the side. The correct functioning of the valve 29 is therefore not dependent on the degree to which it is screwed onto the outlet nozzle 33; it functions in each orientation and can therefore always be screwed to the precise degree required for a tight connection on the outlet nozzle 33.

If the empty container 22 has been removed, it can be dismantled into individual parts with fewer hand movements and can be easily cleaned in a dishwasher. On the valve 29, once it has been unscrewed from the container lower part 31 the cap 38 can be unscrewed from the pin 37, whereupon the pin 37 together with the closing element 40 detaches from the adapter section 34 and all surfaces which come into contact with the beverage are exposed for rinsing purposes. The cup-shaped element 43 can also be unscrewed from the pin 37, in order to facilitate access to the interior of the cup-shaped element 43 which is largely closed during use by the closing element 40.

Compared with the foam layer of the door 3, the openings 25 in the base plate 24, which extend through the foam layer, also unavoidably form a weak point in the thermal insulation here, this is only of little consequence in the case of the inventive refrigeration appliance since the cover 5 prevents air from being freely exchanged between the dispenser recess 20 and the environment of the refrigeration appliance and for this reason, if the cover 5 is not pivoted on both sides, in order to access the dispenser recess 20, ultimately establishes a significantly lower temperature than that in the environment.

In order to achieve as large a temperature difference as possible between the dispenser recess 20 and the environment, the cover 5 itself can be provided with a foamed heat-insulating layer 48 (see FIG. 2, 3), and the window glass 6 can be embodied according to the insulating glass pane as a dual- or multi-compartment glazing with heat-insulating gas filling between the glass plates. Furthermore, analogously to a conventional magnetic seal 49 between the door 4 and housing shell 1, a seal 50, preferably fastened to the inner surface of the cover 5, can also be provided, which, when the cover 5 is in the closed position, is clamped all around the dispenser recess 20 between the cover 5 and the door 4 and thus prevents any air from being exchanged between the dispenser recess 20 and the environment by way of a gap 51 between the cover 5 and door 4.

Figure 8:
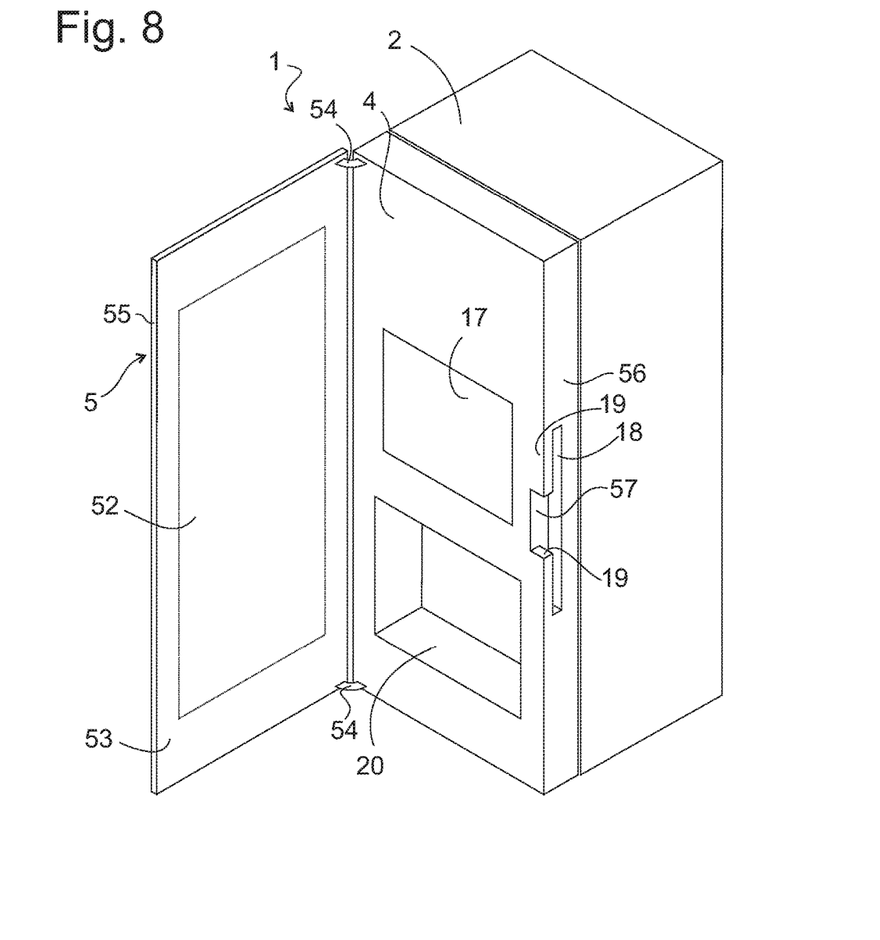
FIG. 8 shows a refrigeration appliance according to a second embodiment of the invention, with a cover in the open position.

FIG. 8 shows a perspective view of a refrigeration appliance according to a second embodiment of the invention. Here the housing of the refrigeration appliance also comprises a door assembly 1 comprising a door 4 and cover 5, as well as a housing shell 2. Here the cover 5 is a rectangular flat plate, preferably made from safety glass, which conceals the door 4 in the closed position. In a central region 52, the plate is transparent, so that when the cover is in the closed position, the insulating glass pane 17 and the dispenser recess 20 are visible through the central region 52. An edge region 53 can be provided with a non-transparent coating, which hides mountings 54 in the closed position for instance, by way of which the cover 5 is connected to the door 4. The seal 50, if present, is adhered to the inner surfaces of the coating of the edge region 53.

Here the lateral edge 55 of the cover which faces away from the mountings 54 is straight. A gripping groove 18 is formed in a face 56 of the door 4 which is positioned behind the edge 55 in the closed position, and a web 19, which extends between the gripping groove 18 and the front side of the door 4, is interrupted in a middle section 57. If a user grips around the edge 55 at the level of this middle section 57, he is not able to take hold of the door 4 and he is therefore only able to open the cover 5. If by contrast he grips above or below the middle section 57 about the edge 55, he is not able to take hold of the rear of the cover 5 because it is concealed by the web 19. In this case, his fingers are only able to grip behind the web 19 in the gripping groove 18, and the entire door assembly is pivoted away from the housing shell 2.

The following is a summary list of reference numerals and the corresponding structure used in the above description of the invention:

1 Door assembly
2 Housing shell, carcass
3 Axis
4 Door
5 Cover
6 Window glass
7 Frame
8 Limb
9 Limb
10 Limb
11 Limb
12 Handle cutout
13 Center piece
14 External wall
15 Internal wall
16 Cavity
17 Insulating glass pane
18 Gripping groove
19 Web
20 Dispenser recess, niche
21 Storage compartment
22 Beverage container
23 Recess
24 Base plate
25 Opening
26 Intermediate wall
27 Door tray
28 Handle
29 Valve
30 Container-valve assembly
31 Container lower part
32 Cover
33 Outlet nozzle
34 Adapter section
35 Base plate
36 Opening
37 Pin 38 Cap
39 Helical spring
40 Closing element
41 Valve seat
42 Web
43 Cup-shaped element
44 Wall
45 Operating paddle
46 Axis
47 Arm
48 Heat-insulating layer
49 Magnetic seal
50 Seal
51 Gap
52 Central region
53 Edge region
54 Mounting
55 Edge
56 Face
57 Middle section
58 Actuation section
59 Drip edge
60 Pivot point

The invention claimed is:

1. A refrigeration appliance, comprising:
a heat-insulating housing enclosing a storage compartment for refrigerated goods;
a dispenser recess disposed outside said heat-insulating housing;
a base plate having at least one opening formed therein defining an opening cross section, said base plate being disposed between said storage compartment and said dispenser recess;
a container-valve assembly detachably installed in said storage compartment and projecting through said opening, said container-valve assembly including a container disposed on said base plate, a valve and an adapter section entirely filling said opening cross section;
said valve including a base plate having an opening formed therein, a valve seat annularly extending about said opening, a closing element resting on said valve seat around said opening in a closed position and touching said valve seat in an open position, a spring biasing said closing element into said closed position, and a cap compressing said spring against said base plate;
an operating paddle being a dual-armed lever installed in said dispenser recess below said base plate, said operating paddle serving to open said valve and fill a vessel with a beverage from said container; and
a cover hinged to said housing and configured to selectively close said dispenser recess.

2. The refrigeration appliance according to claim 1, wherein:
said housing has at least one clear-view window, through which a container of said container-valve assembly arranged in said storage compartment is visible; or
at least one region of said container that faces the clear-view window is translucent; or
said cover extends across said at least one clear-view window.

3. The refrigeration appliance according to claim 1, wherein:
said cover is at least partially transparent; or
said dispenser recess is accommodated in a door of the refrigeration appliance and said cover covers the entire door; or
said container-valve assembly has an adapter section, which fills a cross-section of said opening.

4. The refrigeration appliance according to claim 1, wherein said container is inserted into a recess formed in an inner surface of said housing.

5. The refrigeration appliance according to claim 4, wherein said recess defines length, width and height directions of said recess, and said container fills said recess in said width direction.

6. The refrigeration appliance according to claim 1, wherein said container has a lid in an upper region and a valve is detachably installed on an outlet formed in a lower region of said container.

7. The refrigeration appliance according to claim 1, comprising a plurality of assemblies, each of said assemblies including a respective container and a respective outlet fluidically communicating with said respective container.

8. The refrigeration appliance according to claim 7, wherein said containers have flat side walls adjoining one another.

9. The refrigeration appliance according to claim 1 configured as a domestic refrigeration appliance.

10. The refrigeration appliance according to claim 1, wherein said
closing element is configured to pivot about a pivot point and tilt between said closed position and said open position.

11. The refrigeration appliance according to claim 10, wherein said valve seat is formed in an adapter section, which has a screw thread for screwing to a container.

12. The refrigeration appliance according to claim 10, which comprises a pin that has one end that is fixedly connected to said closing element, extends through said opening and has a further end that faces away from said closing element and is disposed at said cap.

13. The refrigeration appliance according to claim 1, wherein said cap is detachably connected to said pin.

14. The refrigeration appliance according to claim 13, wherein said cap is screwed to said pin.

15. A refrigeration appliance, comprising:
a heat-insulating housing enclosing a storage compartment for refrigerated goods;
a dispenser recess disposed outside said heat-insulating housing;
a base plate having at least one opening formed therein defining an opening cross section, said base plate being disposed between said storage compartment and said dispenser recess;
a container-valve assembly detachably installed in said storage compartment and projecting through said opening, said container-valve assembly including a container disposed on said base plate, a valve and an adapter section entirely filling said opening cross section;
said valve including a valve seat annularly extending about an opening, a closing element resting on said valve seat around said opening in a closed position and touching said valve seat in an open position, an actuation section projecting from said closing element in a flow direction of the beverage passing through said valve and at least one of a cup-shaped element having a passage in a cup base and being attached to said actuation section or a web extending around the valve seat and engaging in said cup-shaped element;

an operating paddle being a dual-armed lever installed in said dispenser recess below said base plate, said operating paddle serving to open said valve and fill a vessel with a beverage from said container; and a cover hinged to said housing and configured to selectively close said dispenser recess.

* * * * *